(12) United States Patent  (10) Patent No.: US 10,843,399 B2
Yoo  (45) Date of Patent: Nov. 24, 2020

(54) METHOD FOR FORMING PATTERN

(71) Applicant: ELCAM CO., LTD, Ulsan (KR)

(72) Inventor: Hong Sup Yoo, Ulsan (KR)

(73) Assignee: ELCAM CO., LTD, Ulsan (KR)

( * ) Notice: Subject to any disclaimer, the term of this patent is extended or adjusted under 35 U.S.C. 154(b) by 171 days.

(21) Appl. No.: 16/081,031

(22) PCT Filed: Feb. 27, 2017

(86) PCT No.: PCT/KR2017/002173
§ 371 (c)(1),
(2) Date: Aug. 29, 2018

(87) PCT Pub. No.: WO2017/150876
PCT Pub. Date: Sep. 8, 2017

(65) Prior Publication Data
US 2019/0091920 A1  Mar. 28, 2019

(30) Foreign Application Priority Data
Mar. 4, 2016 (KR) ........................ 10-2016-0026508

(51) Int. Cl.
| | |
|---|---|
| *B29C 59/02* | (2006.01) |
| *B29C 59/00* | (2006.01) |
| *B29C 39/02* | (2006.01) |
| *B29C 37/00* | (2006.01) |
| *B29L 31/50* | (2006.01) |

(52) U.S. Cl.
CPC .............. *B29C 59/02* (2013.01); *B29C 37/00* (2013.01); *B29C 39/02* (2013.01); *B29C 59/002* (2013.01); *B29L 2031/507* (2013.01)

(58) Field of Classification Search
CPC ......... B29C 59/02; B29C 39/02; B29C 37/00; B29C 59/002; B29L 2031/507
USPC ........................................................ 156/245
See application file for complete search history.

(56) References Cited

U.S. PATENT DOCUMENTS

| | | | | |
|---|---|---|---|---|
| 4,726,412 | A | * 2/1988 | Magnan | ................. B29C 33/56 164/19 |
| 5,482,988 | A | * 1/1996 | Ulman | ................. A61K 9/7069 524/266 |
| 5,526,664 | A | 6/1996 | Vetter | |
| 6,346,168 | B1 | * 2/2002 | Kinsley, Jr. | ............ B01D 39/18 162/145 |

(Continued)

FOREIGN PATENT DOCUMENTS

| | | |
|---|---|---|
| JP | 2010-228116 A | 10/2010 |
| KR | 10-2004-0038653 A | 5/2004 |

(Continued)

OTHER PUBLICATIONS

International Search Report for PCT/KR2017/002173 dated Apr. 28, 2018 from Korean Intellectual Property Office.

*Primary Examiner* — Philip C Tucker
*Assistant Examiner* — Vicki Wu
(74) *Attorney, Agent, or Firm* — Revolution IP, PLLC (57) ABSTRACT

A pattern forming method includes: preparing a pattern paper comprising a fiber where a pattern to be formed is formed; impregnating the pattern paper with a releasing agent; and forming the pattern on a pattern forming target by arranging the pattern paper on a mold comprising an upper mold and a lower mold, and adhering the pattern paper to the pattern forming target by using the mold.

11 Claims, 10 Drawing Sheets

(56) References Cited

U.S. PATENT DOCUMENTS

| | | | |
|---|---|---|---|
| 2005/0206034 A1* | 9/2005 | Yokoyama | B29C 33/3842 264/219 |
| 2005/0238967 A1* | 10/2005 | Rogers | B82Y 10/00 430/5 |
| 2011/0262765 A1 | 10/2011 | Yu et al. | |
| 2015/0072139 A1 | 3/2015 | Morita et al. | |

FOREIGN PATENT DOCUMENTS

| | | |
|---|---|---|
| KR | 10-0915150 B1 | 9/2009 |
| KR | 10-0946221 B1 | 3/2010 |
| KR | 10-1178029 B1 | 8/2012 |
| KR | 10-1402955 B1 | 6/2014 |
| KR | 101402955 B1 * | 6/2014 |
| KR | 10-2015-0008148 A | 1/2015 |

\* cited by examiner

METHOD FOR FORMING PATTERN

TECHNICAL FIELD

The present disclosure relates to a pattern forming method, and more particularly, to a pattern forming method for forming a required pattern by additionally providing a pattern paper of a fiber material to an existing pattern forming mold.

BACKGROUND ART

Generally, while manufacturing garments, shoes, bags, etc, various patterns are formed on surfaces thereof via dyeing or transferring for aesthetic appeal. A method for forming a pattern on a fabric surface of garments, shoes, bags, etc. largely includes a printing method and a mold pressing method.

The printing method is a method of printing a fabric by using a translucent pigment.

The mold pressing method is a method of forming a pattern on a target surface by pressing a mold where a certain pattern is formed onto a pattern forming target.

Here, the mold pressing method is a method in which a required pattern is formed by adhering and then pressing the mold where the certain pattern is formed onto a workpiece.

In the mold pressing method, since only a pattern formed on a mold being used is formed on a workpiece, a plurality of molds need to be prepared so as to form various patterns.

Since a mold is a product that consumes high manufacturing costs and long manufacturing time, it takes a lot of time to prepare and manufacture a plurality of molds, and thus the cost of a finished product may increase.

A prior art of the present disclosure may include Korean Patent No. 10-1402955.

DESCRIPTION OF EMBODIMENTS

Technical Problem

Provided is a pattern forming method for forming a pattern by using a fiber instead of a mold of a metal material.

Also, provided is a pattern forming method for forming a required pattern by additionally providing a pattern paper of a fiber material to an existing pattern forming mold.

Solution to Problem

According to an aspect of the present disclosure, a pattern forming method includes: preparing a pattern paper including a fiber where a pattern to be formed is formed; impregnating the pattern paper with a releasing agent; and forming the pattern on a pattern forming target by arranging the pattern paper on a mold including an upper mold and a lower mold, and adhering the pattern paper to the pattern forming target by using the mold.

The pattern forming method may further include applying heat to the pattern paper and the pattern forming target.

The pattern paper may include carbon fiber, polyketone fiber, aramid, silica, polyester, polyurethane, or nylon, and an original form of the pattern may be formed on a surface of the pattern paper.

The pattern paper may include: a pattern forming layer including carbon fiber, polyketone fiber, aramid, silica, polyester, polyurethane, or nylon, and having a surface where an original form of the pattern is formed; and a reinforced fiber layer provided on a rear surface of the pattern forming layer and including rubber, silicon, or metal fiber.

The preparing of the pattern paper may include: arranging a bonding member between the pattern forming layer and the reinforced fiber layer; and bonding the pattern forming layer and the reinforced fiber layer by applying heat.

The bonding member may include a hot melt film.

The preparing of the pattern paper may include: applying an adhesive between the pattern forming layer and the reinforced fiber layer; and bonding the pattern forming layer and the reinforced fiber layer by applying heat.

The forming of the pattern may include: arranging the pattern paper on each of the upper mold and the lower mold; and forming the pattern on the pattern forming target by combining the upper mold and the lower mold.

The pattern paper may be adhered to a surface of the upper mold.

The pattern paper may be adhered to a surface of the lower mold.

The forming of the pattern may include: arranging the pattern paper on the lower mold; and forming the pattern on the pattern forming target by combining the upper mold and the lower mold.

The pattern paper may be adhered to a surface of the lower mold.

The pattern may be adhered by applying an adhesive.

Advantageous Effects of Disclosure

According to the present disclosure, a pattern may be formed by using a fiber instead of a mold of a metal material.

Also, according to the present disclosure, a required pattern may be formed by additionally providing a pattern paper of a fiber material to an existing pattern forming mold.

BEST MODE

Hereinafter, exemplary embodiments of the present disclosure will be described in detail with reference to accompanying drawings.

Figure 1:
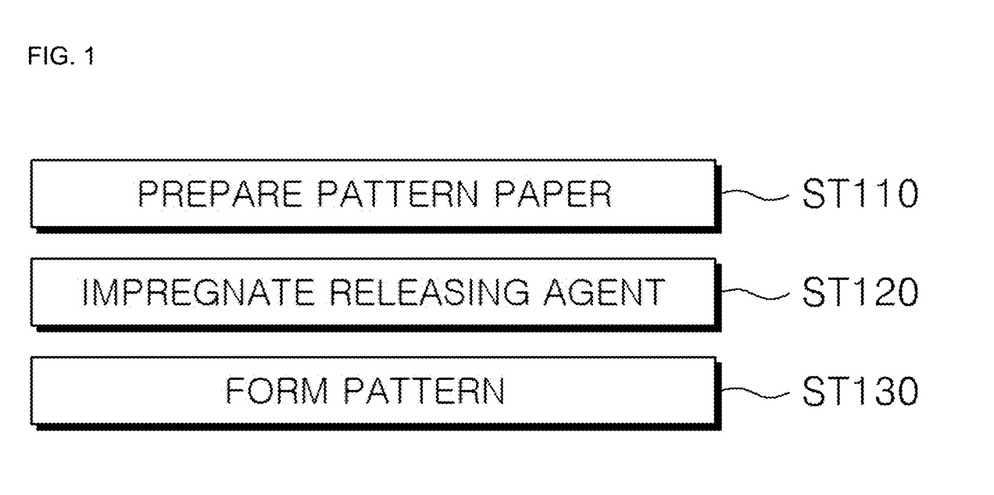
FIG. 1 is a flowchart of a pattern forming method according to the present disclosure.

FIG. 1 is a flowchart of a pattern forming method according to the present disclosure.

Referring to FIG. 1, the pattern forming method according to an embodiment of the present disclosure includes preparing a pattern paper (operation ST110), impregnating (operation ST120), and forming a pattern (operation ST130).

The preparing of the pattern paper (operation ST110) is an operation of preparing a fiber where an original form of a pattern to be formed on a pattern forming target is formed.

Here, the fiber used to produce the pattern paper includes carbon fiber, polyketone fiber, aramid, or silica. Here, when the pattern forming target is a material having low strength, the fiber may include synthetic fiber, such as polyester, polyurethane, or nylon.

A user cuts the prepared fiber to a desired size. A certain pattern may be formed on a surface of the cut fiber.

Here, the fiber is a material produced by using natural or artificial threads.

Figure 2:
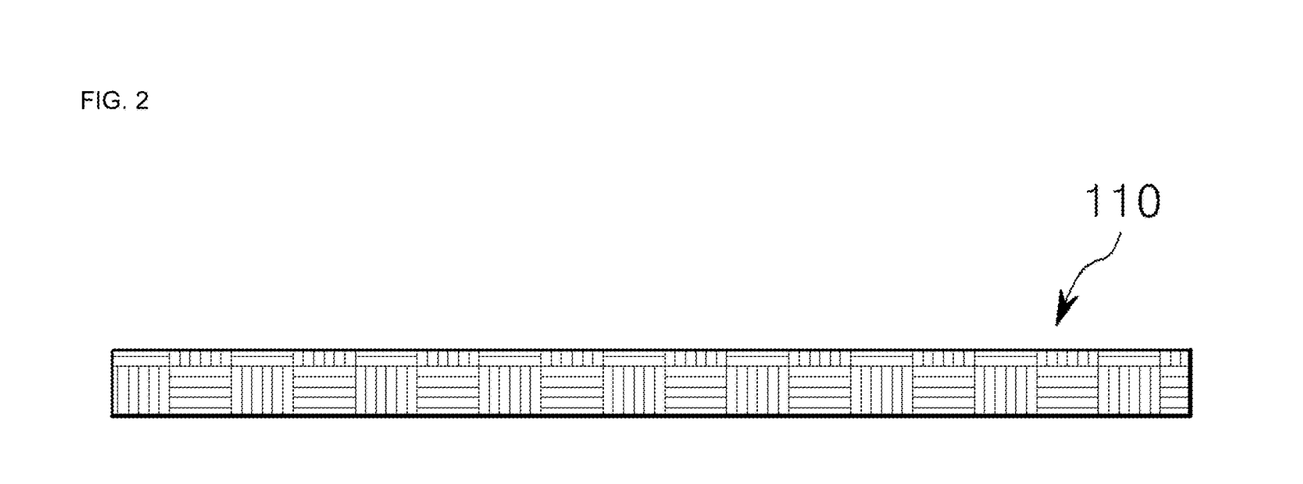
FIG. 2 is a diagram of examples of a pattern of a surface of a prepared fiber.

FIG. 2 is a diagram of examples of a pattern of a surface of a prepared fiber, and as shown in FIG. 2, the pattern has a form in which threads are weaved to cross each other.

Figure 3:
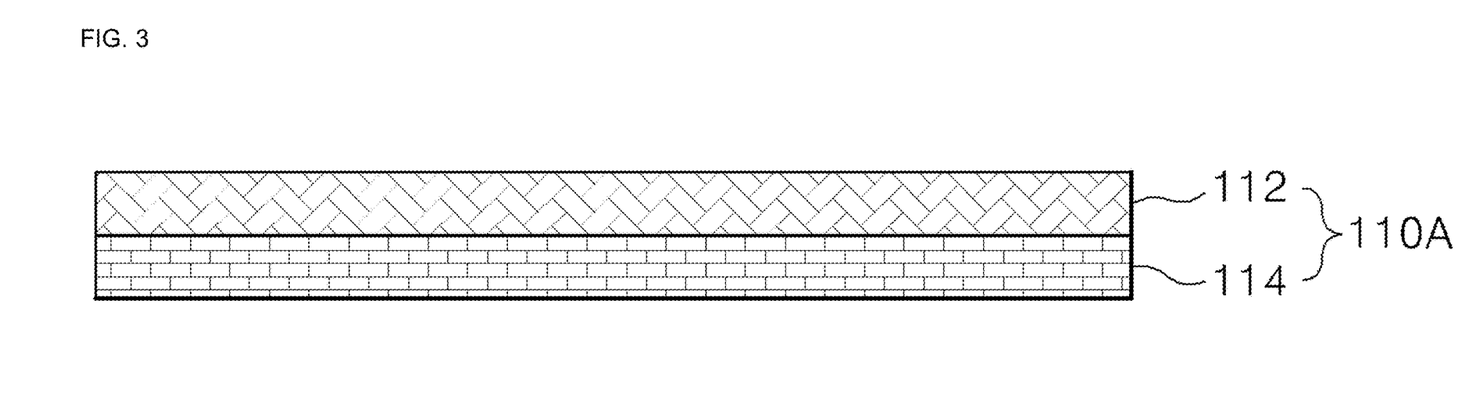
FIG. 3 is a diagram of another example of a pattern of a surface of a prepared fiber.

FIG. 3 is a diagram of another example of a pattern of a surface of a prepared fiber, and flower patterns are formed on the surface of the fiber.

As described above, a certain pattern may be formed on the fiber during a weaving process, and in addition, various patterns required by the user may be formed.

In the present disclosure, a fiber where an original form of a certain pattern required by the user may be prepared as shown in FIG. 2 or 3, and the prepared fiber may be used as the pattern paper.

Figure 4:
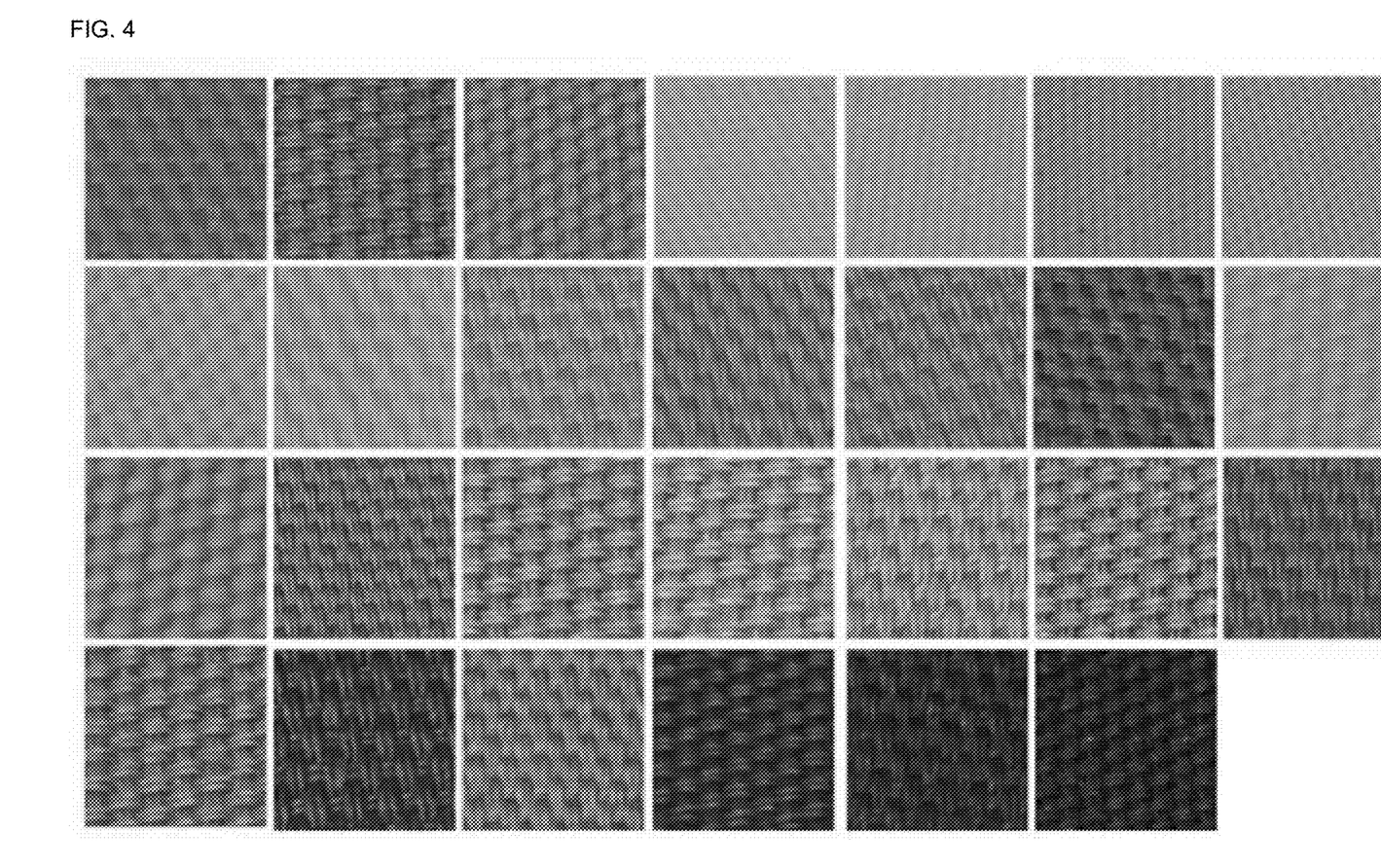
FIG. 4 is a cross-sectional view of an example of a configuration of a pattern paper used in the present disclosure.

FIG. 4 is a cross-sectional view of an example of a configuration of a pattern paper used in the present disclosure. Referring to FIG. 4, a pattern paper 110 may include a single fiber layer as shown in the drawing.

The pattern paper 110 having a single fiber layer shown in FIG. 4 may be applied when a pattern is formed on a material having good moldability, such as leather or foam.

Figure 5:
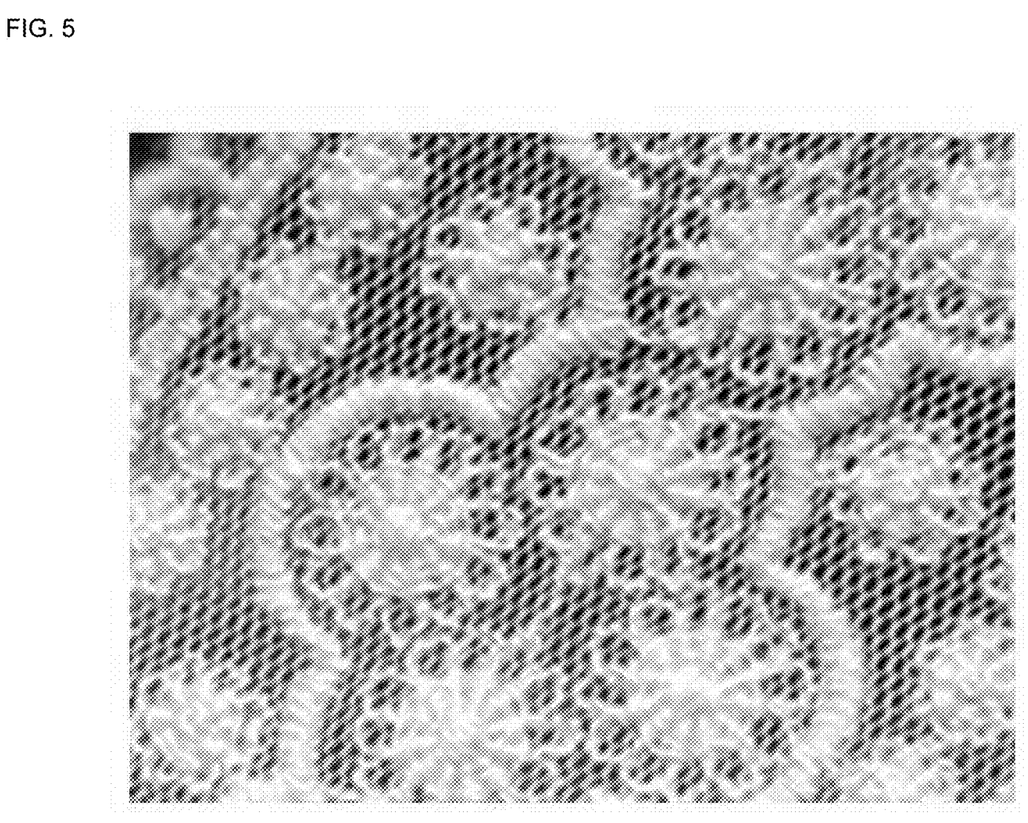
FIG. 5 is a cross-sectional view of another example of a configuration of a pattern paper used in the present disclosure.

FIG. 5 is a cross-sectional view of another example of a configuration of a pattern paper used in the present disclosure.

Referring to FIG. 5, a pattern paper 110A may include two fiber layers as shown in the drawing.

Here, the pattern paper 110A includes a pattern forming layer 112 and a reinforced layer 114.

The pattern forming layer 112 is formed of a fiber having a surface where an original form of a pattern to be formed on a pattern forming target is formed. The pattern forming layer 112 may include carbon fiber, polyketone fiber, aramid, silica, polyester, polyurethane, or nylon.

The reinforced layer 114 is arranged on a rear surface of the pattern forming layer 112 such that the pattern paper 110A has durability with respect to pressure while the pressure is applied in operation ST130 as described below. The reinforced layer 114 includes rubber, silicon, or metal fiber.

The pattern paper 110A shown in FIG. 5 may be applied when a pattern is formed on a material having low moldability (ductile plastic or the like).

Figure 6:
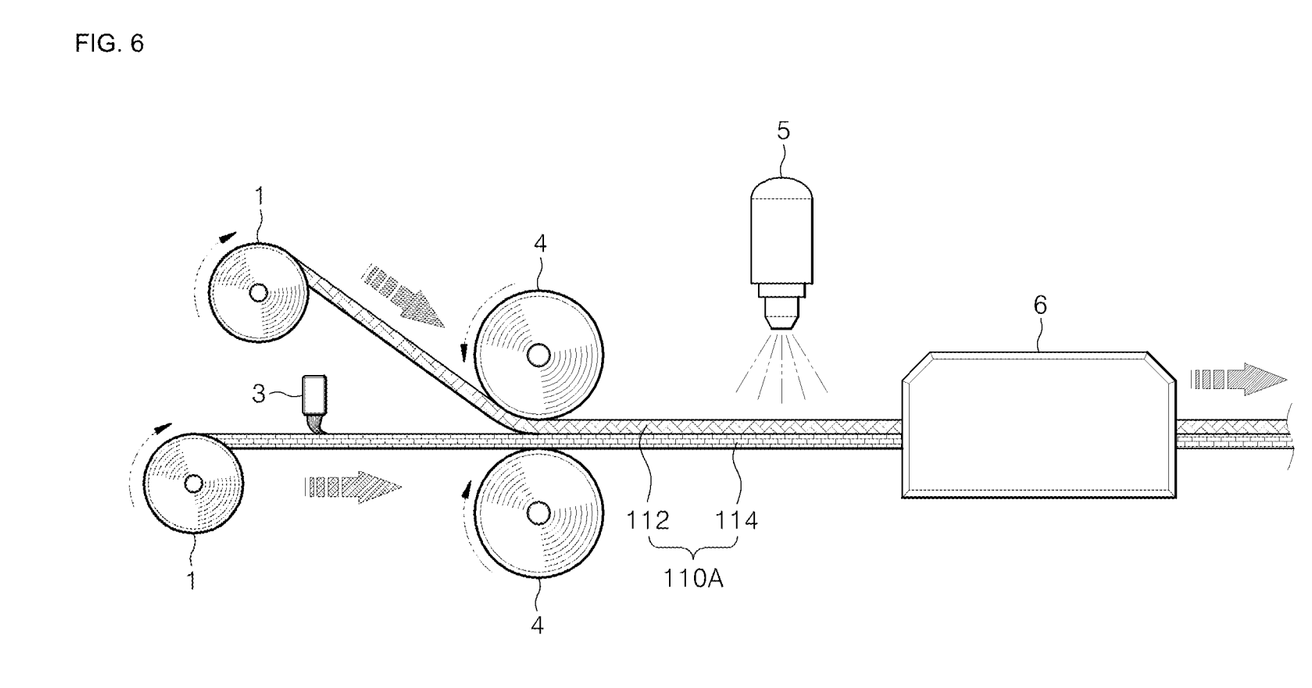
FIG. 6 is a diagram for describing an example of manufacturing the pattern paper of FIG. 4.

FIG. 6 is a diagram for describing an example of manufacturing the pattern paper of FIG. 4.

Bonding of the pattern forming layer 112 and the reinforced layer 114 to manufacture the pattern paper 110A will be described with reference to FIG. 6.

Fibers used as the pattern forming layer 112 and the reinforced layer 114 are each stored while being wound around a certain roller 1. For a bonding process, the fibers wound around the rollers 1 are unwound at a uniform speed.

The user uniformly applies an adhesive on surfaces of the pattern forming layer 112 and the reinforced layer 114, which contact each other. Here, the adhesive may be applied on one of the pattern forming layer 112 and the reinforced layer 114, or on each of the pattern forming layer 112 and the reinforced layer 114, as needed by the user.

Also, the adhesive may be applied by using an adhesive applicator 3, but a roller, spray, or the like may be used as long as the adhesive is uniformly applied.

The adhesive used to bond the pattern forming layer 112 and the reinforced layer 114 includes a rubber-based adhesive or a hot melt-based adhesive.

Then, the pattern forming layer 112 and the reinforced layer 114 are adhered to each other as an adhesive applied surface is moved between pressing rollers 4.

The pressing rollers 4 are configured as rollers having the same size are spaced apart from each other at a certain distance.

The pattern forming layer 112 and the reinforced layer 114 are transferred between the pressing rollers 4 and are adhered to each other upon receiving certain pressure, and thus are bonded. Here, certain heat may be applied so as to improve adhesive strength between the pattern forming layer 112 and the reinforced layer 114.

Figure 7:
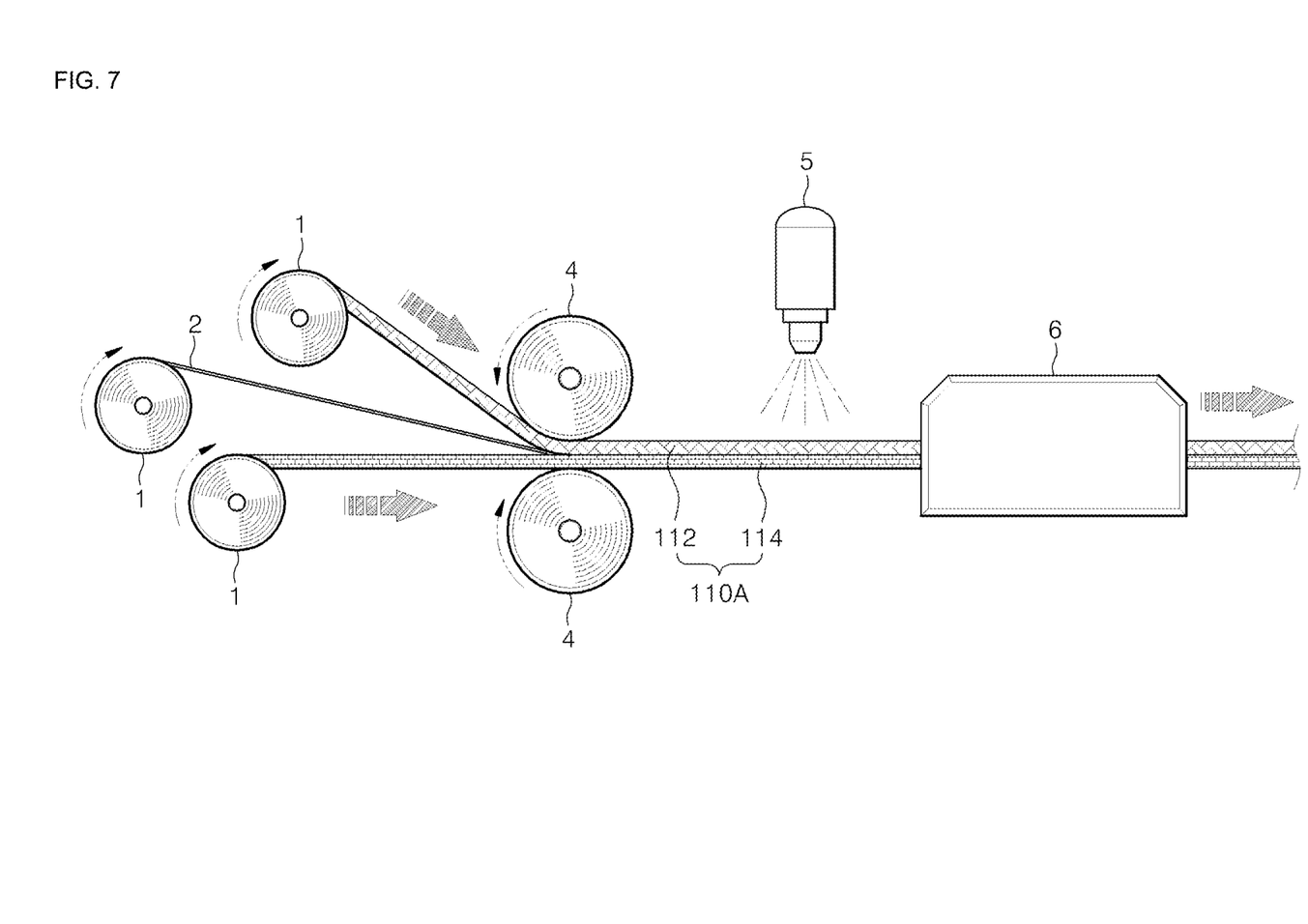
FIG. 7 is a diagram for describing another example of manufacturing the pattern paper of FIG. 4.

FIG. 7 is a diagram for describing another example of manufacturing the pattern paper of FIG. 4.

Bonding of the pattern forming layer 112 and the reinforced layer 114 to manufacture the pattern paper 110A will be described with reference to FIG. 7.

Fibers used as the pattern forming layer 112 and the reinforced layer 114 are each stored while being wound around a certain roller 1. Also, a hot melt film 2 for bonding the pattern forming layer 112 and the reinforced layer 114 is also wound around the certain roller 1.

For a bonding process, fibers and films wound around the rollers 1 are unwound at a uniform speed. Here, the hot melt film 2 is arranged between the pattern forming layer 112 and the reinforced layer 114 before the pattern forming layer 112 and the reinforced layer 114 are moved between the pressing rollers 4.

Then, the pattern forming layer 112, the reinforced layer 114, and the hot melt film 2 are moved between the pressing rollers 4 and are adhered to each other.

The pressing rollers 4 are configured as rollers having the same size are spaced apart from each other at a certain distance.

The pattern forming layer 112 and the reinforced layer 114 are transferred between the pressing rollers 4 to receive certain pressure and heat, and are adhered to each other when the hot melt film 2 melts.

The impregnating (operation ST120) is described with reference to FIGS. 6 and 7.

The impregnating (operation ST120) is an operation of supplying a releasing agent on the surface of the pattern forming layer 112 of the pattern paper 110A in which the pattern forming layer 112 and the reinforced layer 114 are bonded such that a certain release layer is formed as the releasing agent penetrates into the fiber. Here, when the release layer is formed only on the surface of the pattern paper 110A, the release layer may be damaged as processes are repeated. Thus, in order to prevent the damage, the releasing agent may penetrate into the fiber up to a certain depth.

According to the current embodiment, the releasing agent may be supplied by a spray 5, but alternatively, any one of various methods may be used as needed by the user.

Also, the impregnating (operation ST120) may be performed on the pattern paper 110 including a single fiber layer as shown in FIG. 2, in the same manner.

The release layer formed during the impregnating (operation ST120) enables a pattern paper and a pattern forming target to be easily separated during a process described later.

After the releasing agent is impregnated, certain heat is applied to the pattern paper 110A by using a heater 6 to harden the releasing agent, thereby forming a certain release layer.

The forming of the pattern (operation ST130) is an operation of forming a required pattern on a pattern forming surface of the pattern forming target by adhering the pattern forming surface and the original form of the pattern of the pattern paper 110A to each other.

Figure 8:
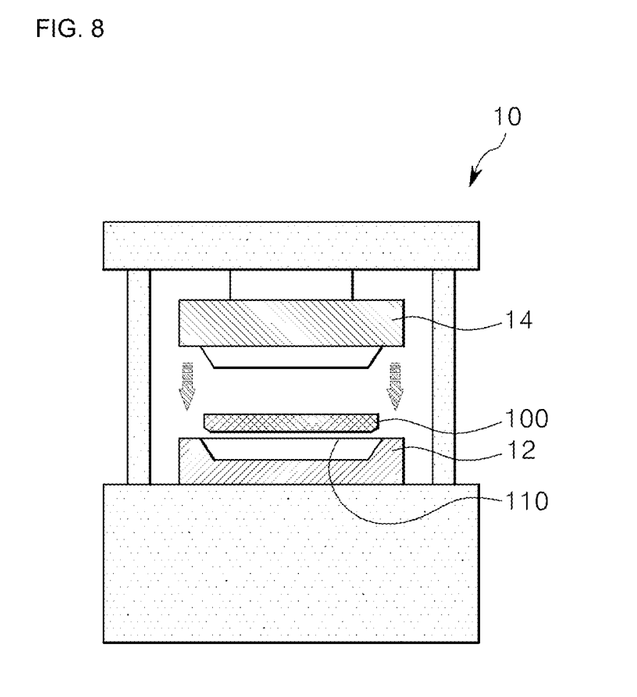
FIG. 8 is a diagram for describing an example of an arrangement of a pattern paper and a pattern forming target.

FIG. 8 is a diagram for describing an example of an arrangement of a pattern paper and a pattern forming target, wherein a pattern is formed on one surface of the pattern forming target.

First, a certain press 10 is prepared. Here, a lower mold 12 and an upper mold 14 that is provided above the lower mold 12 and applies pressure on a workpiece provided on the lower mold 12 are provided on the press 10.

The user may form a certain basic pattern on the pattern forming target by using the lower mold 12 and the upper mold 14.

Following operations are performed when a certain pattern is added to a pattern forming target 100.

The user arranges the pattern paper 110 and the pattern forming target 100 between the lower mold 12 and the upper mold 14. Here, the pattern paper 110 may be arranged such that an edge of the pattern paper contacts an upper edge of the lower mold 12, and thus the pattern paper 110 may be evenly spread on the lower mold 12. As needed by the user, the pattern paper 110 may be adhered to the surface of the lower mold 12.

Accordingly, the original form of the pattern on the surface of the pattern paper 110 may contact the pattern forming surface of the pattern forming target 100. Although not illustrated, a reinforcing plate of a metal material may be provided at a rear surface of the pattern paper 110 such that the pattern paper 110 maintains a spread state.

Then, the user operates the press 10.

Figure 9:
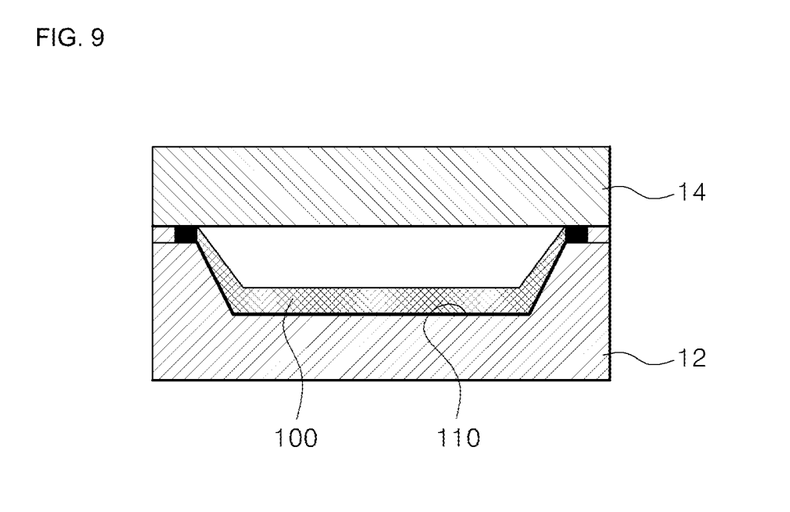
FIG. 9 diagram of an adhered state of the pattern paper and the pattern forming target of FIG. 8.

FIG. 9 diagram of an adhered state of the pattern paper and the pattern forming target of FIG. 8.

Referring to FIG. 9, when the upper mold 14 moves downward to be adhered to the lower mold 12 according to operation of the press 10, a certain pattern may be formed on the pattern forming surface below the pattern forming target 100 according to pressure of the upper mold 14.

Figure 10:
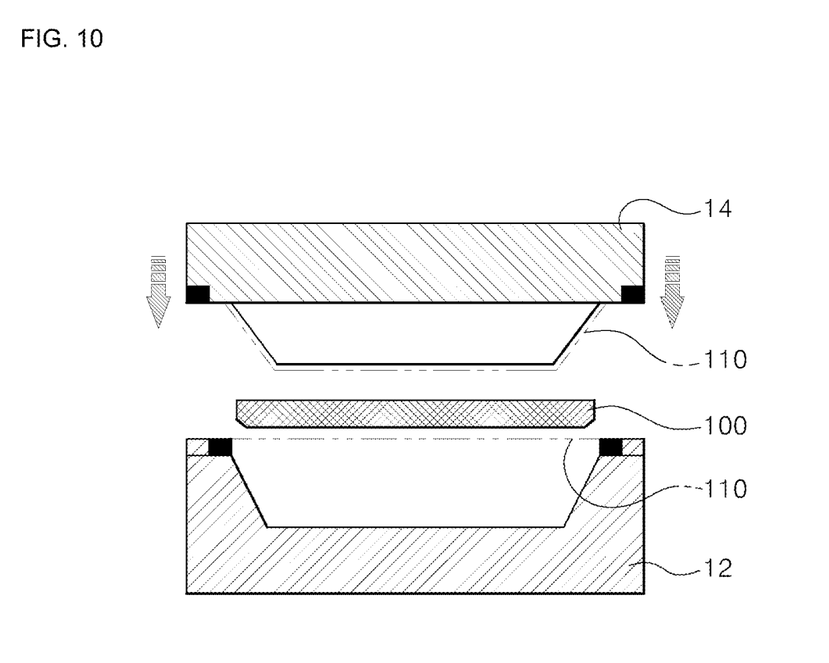
FIG. 10 is a diagram for describing another example of an arrangement of a pattern paper and a pattern forming target.

FIG. 10 is a diagram for describing another example of an arrangement of a pattern paper and a pattern forming target.

Referring to FIG. 10, a pattern paper is arranged on each of the lower mold 12 and the upper mold 14, and the pattern forming target 100 is provided between the lower mold 12 and the upper mold 14.

Here, the pattern paper 110 is evenly spread on the lower mold 12 as shown in FIG. 8, and the pattern paper 110 is adhered to the surface of the upper mold 14.

Here, a hot melt adhesive and a high-temperature adhesive are applied on the surface of the upper mold 14 such that the pattern paper 110 maintains a state of being adhered to the surface of each of the lower mold 12 and the upper mold 14.

Then, the user arranges the lower mold 12 and the upper mold 14, sequentially arranges the pattern paper 110, the pattern forming target 100, and the pattern paper 110 therebetween, and operates the press 10 such that a pattern is formed on a lower surface and an upper surface of the pattern forming target.

Figure 11:
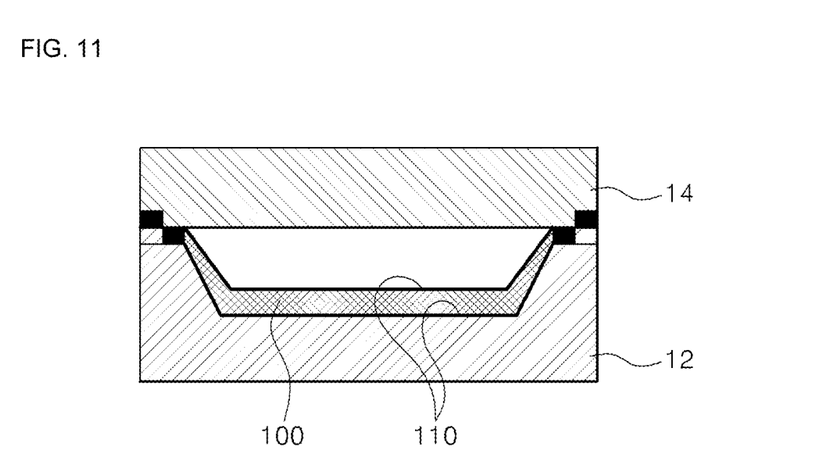
FIG. 11 is a diagram of an adhered state of the pattern paper and the paper forming target of FIG. 10.

FIG. 11 is a diagram of an adhered state of the pattern paper and the paper forming target of FIG. 10.

Referring to FIG. 11, when the upper mold 14 moves downward to be adhered to the lower mold 12 according to operation of the press 10, a certain pattern may be formed on two surfaces of the pattern forming target 100 according to pressure of the upper mold 14.

Figure 12:
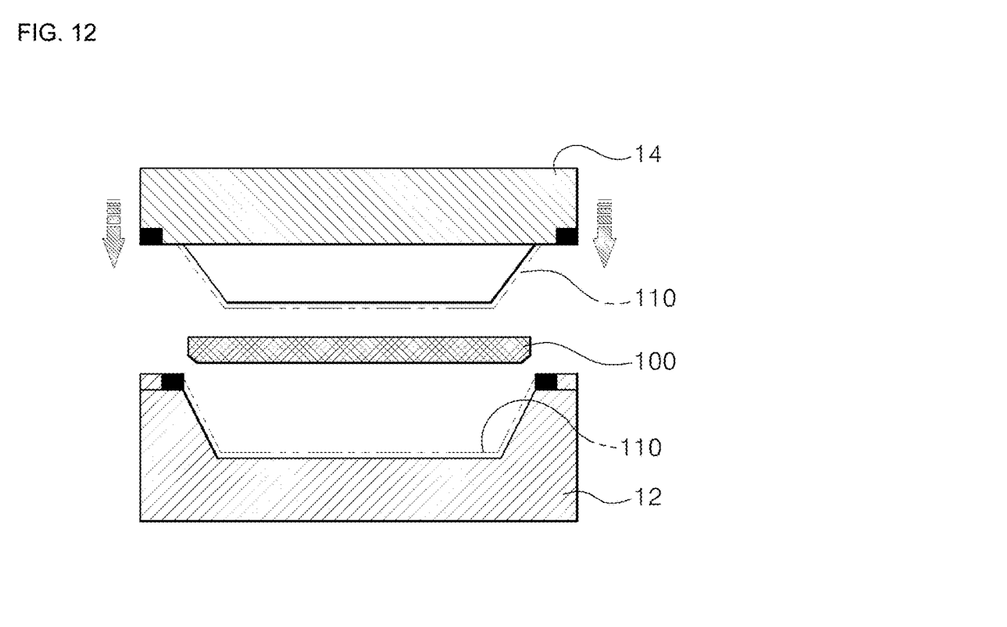
FIG. 12 is a diagram for describing another example of an arrangement of a pattern paper and a pattern forming target.

FIG. 12 is a diagram for describing another example of an arrangement of a pattern paper and a pattern forming target.

Referring to FIG. 12, a pattern paper is arranged on each of the lower mold 12 and the upper mold 14, and the pattern forming target 100 is provided between the lower mold 12 and the upper mold 14.

Here, the pattern paper 110 is adhered to the surface of each of the lower mold 12 and the upper mold 14.

Here, a hot melt adhesive and a high-temperature adhesive are applied on the surfaces of the lower mold 12 and the upper mold 14 such that the pattern paper 110 maintains a state of being adhered to the surface of each of the lower mold 12 and the upper mold 14.

Then, the user operates the press 10 such that a pattern is formed on a lower surface and an upper surface of the pattern forming target. An adhered state of the pattern paper and the pattern forming target is the same as that in the previous embodiment.

Figure 13:
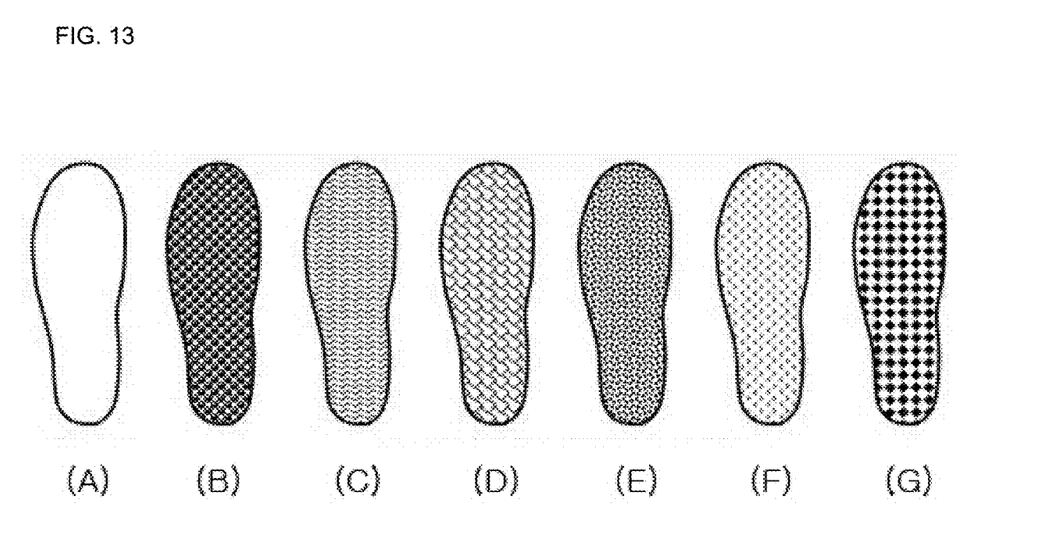
FIG. 13 is a diagram of examples where a pattern is formed on an insole, according to the present disclosure.

FIG. 13 is a diagram of examples where a pattern is formed on an insole, according to the present disclosure.

Referring to FIG. 13, a pattern required by the user is formed on a bottom surface of an insole of a shoe.

In other words, (A) of FIG. 13 is an insole on which a separate pattern is not formed. (B) through (G) of FIG. 13 are insoles on which various patterns are added to the insole of (A) by applying the present disclosure.

Figure 14:
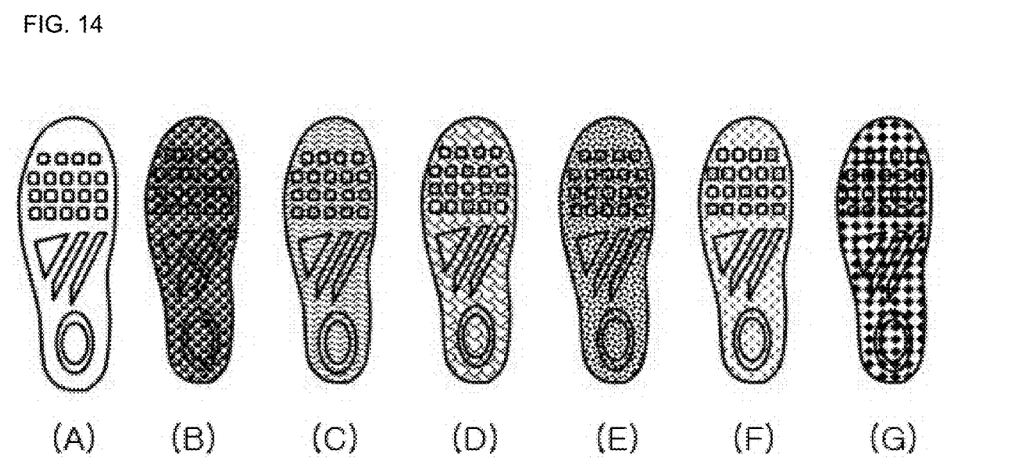
FIG. 14 is a diagram of examples where a pattern is formed on a sole of a shoe, according to the present disclosure.

FIG. 14 is a diagram of examples where a pattern is formed on a sole of a shoe, according to the present disclosure.

Referring to FIG. 14, a pattern required by the user is formed on a bottom of the sole of the shoe.

In other words, (A) of FIG. 14 is a sole of a shoe on which only a basic pattern is formed. (B) through (G) of FIG. 14 are soles on which various patterns are added to the sole of (A) by applying the present disclosure.

Figure 15:
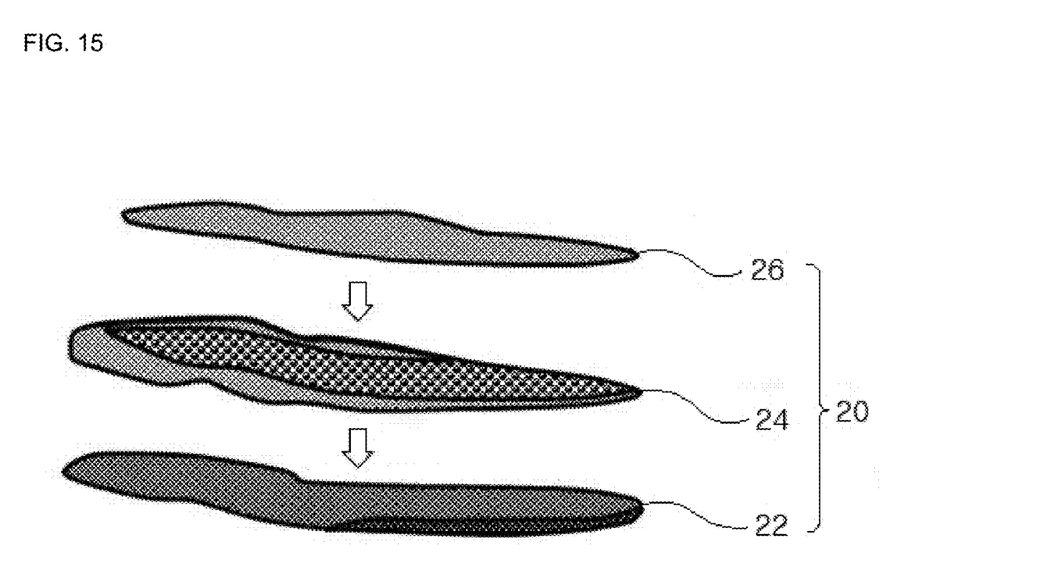
FIG. 15 is a diagram for describing utilization of a midsole where a certain pattern is formed by using the present disclosure.

FIG. 15 is a diagram for describing utilization of a midsole where a certain pattern is formed by using the present disclosure.

Referring to FIG. 15, a midsole 24 is arranged on and then adhered to an outsole 22, and an inner tape 26 is arranged on and adhered to the midsole 24, thereby completing a sole 20 of a shoe.

Here, when a certain pattern is formed on a top surface and a bottom surface of the midsole 24 arranged in the middle, according to the present disclosure, adhesive strength to the outsole 22 and the inner tape 26 adhered top and bottom of the midsole 24 is increased.

Also, while manufacturing the midsole 24, a surface grinding process may be omitted and thus a manufacturing time may be reduced.

When various types of patterns, such as an embossed pattern, are additionally formed below a sole as described above, air permeability may be improved, slipping may be prevented, and product moldability may be improved.

According to the present disclosure, a pattern may be formed by using fiber instead of a mold of a metal material, and a required pattern may be formed by additionally providing a pattern paper of a fiber material to an existing pattern forming mold.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A pattern forming method comprising:
    preparing a pattern paper comprising a fiber where a pattern is formed;
    impregnating the pattern paper with a releasing agent; and
    forming the pattern on a pattern forming target by arranging the pattern paper on a mold comprising an upper mold and a lower mold, and pressing the pattern paper to the pattern forming target by using the mold,
    wherein the forming of the pattern comprises:
    arranging the pattern paper on each of the upper mold and the lower mold; and
    forming the pattern on the pattern forming target by combining the upper mold and the lower mold.

2. The pattern forming method of claim 1, further comprising applying heat to the pattern paper and the pattern forming target.

3. The pattern forming method of claim 1, wherein the fiber comprises carbon fiber, polyketone fiber, aramid, silica, polyester, polyurethane or nylon, and an original form of the pattern is formed on a surface of the pattern paper.

4. The pattern forming method of claim 1, wherein the pattern paper comprises:
    a pattern forming layer comprising the fiber including carbon fiber, polyketone fiber, aramid, silica, polyester, polyurethane, or nylon, and having a surface where an original form of the pattern is formed; and
    a reinforced fiber layer provided on a rear surface of the pattern forming layer and comprising rubber, silicon, or metal fiber.

5. The pattern forming method of claim 4, wherein the preparing of the pattern paper comprises:
    arranging a bonding member between the pattern forming layer and the reinforced fiber layer; and
    bonding the pattern forming layer and the reinforced fiber layer by applying heat.

6. The pattern forming method of claim 5, wherein the bonding member comprises a hot melt film.

7. The pattern forming method of claim 4, wherein the preparing of the pattern paper comprises:
    applying an adhesive between the pattern forming layer and the reinforced fiber layer; and
    bonding the pattern forming layer and the reinforced fiber layer by applying heat.

8. The pattern forming method of claim 1, wherein the pattern paper is adhered to a surface of the upper mold.

9. The pattern forming method of claim 8, wherein the pattern paper is adhered to a surface of the lower mold.

10. The pattern forming method of claim 8, wherein the pattern paper is adhered to the surface of the upper mold by applying an adhesive.

11. The pattern forming method of claim 9, wherein the pattern paper is adhered to the surface of the lower mold by applying an adhesive.

* * * * *